(12) United States Patent
Wu (10) Patent No.: US 9,610,811 B2
(45) Date of Patent: Apr. 4, 2017

(54) TIRE TOOL

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 311 days.

(21) Appl. No.: 14/556,336

(22) Filed: Dec. 1, 2014

(65) Prior Publication Data

US 2016/0152101 A1     Jun. 2, 2016

(51) Int. Cl.
*B60C 25/02*     (2006.01)

(52) U.S. Cl.
CPC .................................. *B60C 25/02* (2013.01)

(58) Field of Classification Search
CPC ............................... B60C 25/02; F04B 33/005
See application file for complete search history.

(56) References Cited

U.S. PATENT DOCUMENTS

| | | | | |
|---|---|---|---|---|
| 5,683,234 A | * | 11/1997 | Chuang | F04B 33/005 137/223 |
| 5,715,554 A | * | 2/1998 | Downs | F04B 33/005 152/415 |
| 5,898,965 A | * | 5/1999 | Chuang | F04B 33/005 157/1.3 |
| 9,194,385 B1 | * | 11/2015 | Dooley | B60C 25/02 417/313 |

FOREIGN PATENT DOCUMENTS

TW     M438984 U     10/2012

* cited by examiner

*Primary Examiner* — David B Thomas
(74) *Attorney, Agent, or Firm* — Alan D. Kamrath; Kamrath IP Lawfirm, P.A.

(57) ABSTRACT

A tire tool includes a body including a tire levering end and an inflating end including first connecting end delimiting a first fluid channel and a second connecting end delimiting a second fluid channel. The first and second channels fluidly connect to one another.

12 Claims, 9 Drawing Sheets

FIG. 9

TIRE TOOL

BACKGROUND OF THE INVENTION

1. Field of the Invention

The present invention relates to a tire tool and, particularly to a tire tool including tire levering and an inflating ends.

2. Description of the Related Art

TW Patent No. M438984 shows a tire tool that is adapted to pry a tire up and over a rim, therefore, facilitates removal of the tire from the rim. By deflating the tire, the tire tool is able to be placed between tire bead and rim sidewall to pry the tire out of place. The tire tool may be used again to pry the tire bead of the tire down to the rim sidewall to reinstall the tire on the rim. After the tire is mounted on the rim, the tire tool is removed. Then, the tire can be inflated. Conventionally, an air inflator is used to pump the tire. Therefore, the tire tool and the air inflator are used when replacing the tire as set forth above.

The present invention is, therefore, intended to obviate or at least alleviate the problems encountered in the prior art.

SUMMARY OF THE INVENTION

According to the present invention, a tire tool includes a body including a tire levering end and an inflating end including a first connecting end delimiting a first fluid channel and a second connecting end delimiting a second fluid channel. The first and second channels fluidly connect to one another.

It is an object of the present invention to provide a tire tool including tire levering and inflating ends.

Other objects, advantages, and new features of the present invention will become apparent from the following detailed description of the invention when considered in conjunction with the accompanied drawings.

DETAILED DESCRIPTION OF THE PREFERRED EMBODIMENTS

FIGS. 1 through 6 show a tire tool 10 in accordance with a first embodiment of the present invention. The tire tool 10 includes a body 20 including a tire levering end 21. The tire levering end 21 has a distal end coincident with a distal end of the body 20. The tire levering end 21 has a reduced thickness as it extends along a longitudinal direction of the body 20 toward the distal end thereof. The body 20 extends longitudinally along a phantom axis L. The tire tool 10 includes an inflating end including a first connecting end 22 delimiting a first fluid channel and a second connecting end 23 delimiting a second fluid channel. The tire levering end 21 and the inflating end are disposed opposite to one another axially. The first fluid channel delimits a first opening at a distal end of the first connecting end 22. The second fluid channel delimits a second opening at a distal end of the second connecting end 23. The first and second channels fluidly connect to one another and are sections of a fluid channel 24. The first connecting end 22 includes an insert 25 and a gasket 26 disposed within the first fluid channel. The insert 25 has a protruded end adapted to abut a valve core of a valve, thereby opening the valve core of the valve. The gasket 26 has an annular shape and includes a hole extending therethrough. The second connecting end 23 includes a seal 27 disposed within the second fluid channel and a cap 28 connected thereto. The seal 27 has a hole extending therethrough. The cap 28 restrains the seal 27 and includes a hole extending therethrough, which has a diameter smaller than a diameter of the hole extending through the seal 27. The first fluid channel in the first connecting end 22 has a periphery thereof forming inner threads. The second fluid channel in the second connecting end 22 has a periphery thereof forming inner threads. The cap 28 has an outer threads engaging with the inner threads.

Figure 1:
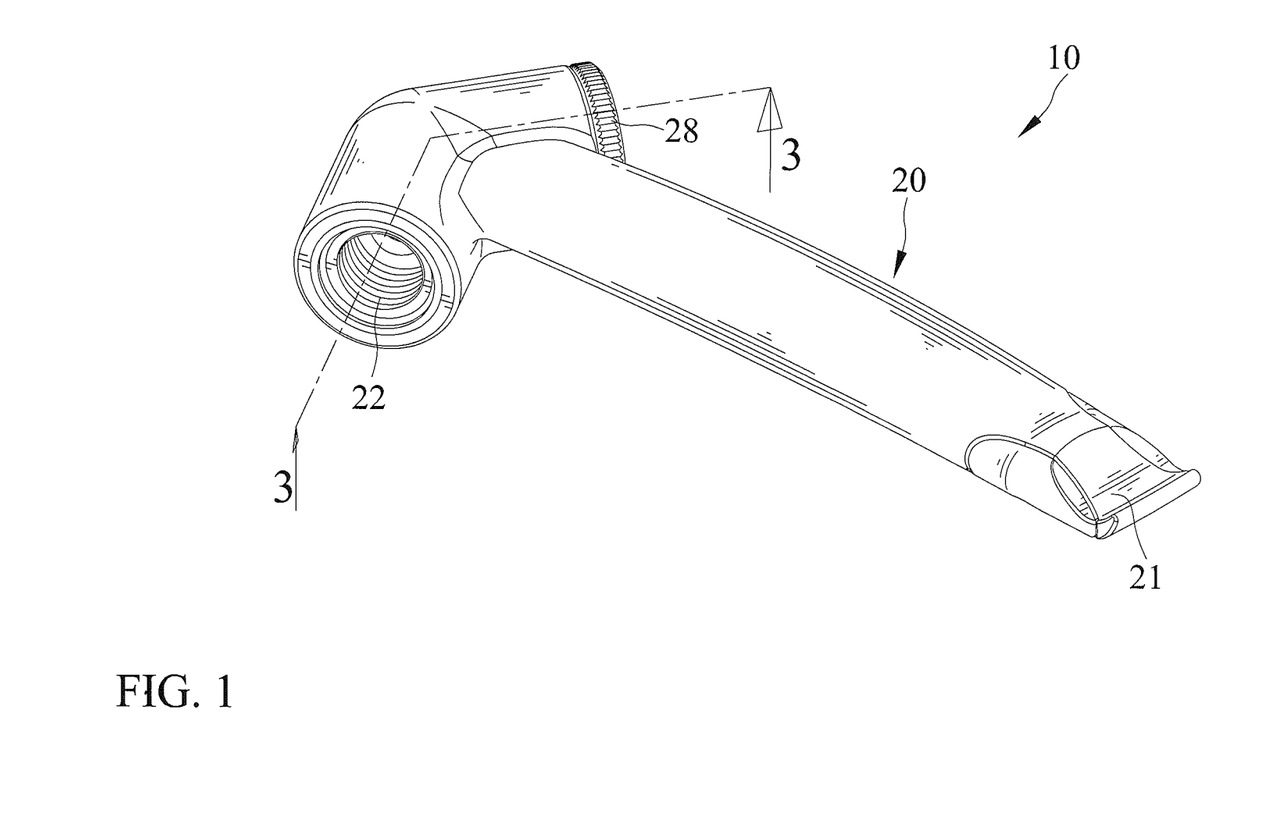
FIG. 1 is a perspective view of a tire tool in accordance with a first embodiment of the present invention.
Figure 2:
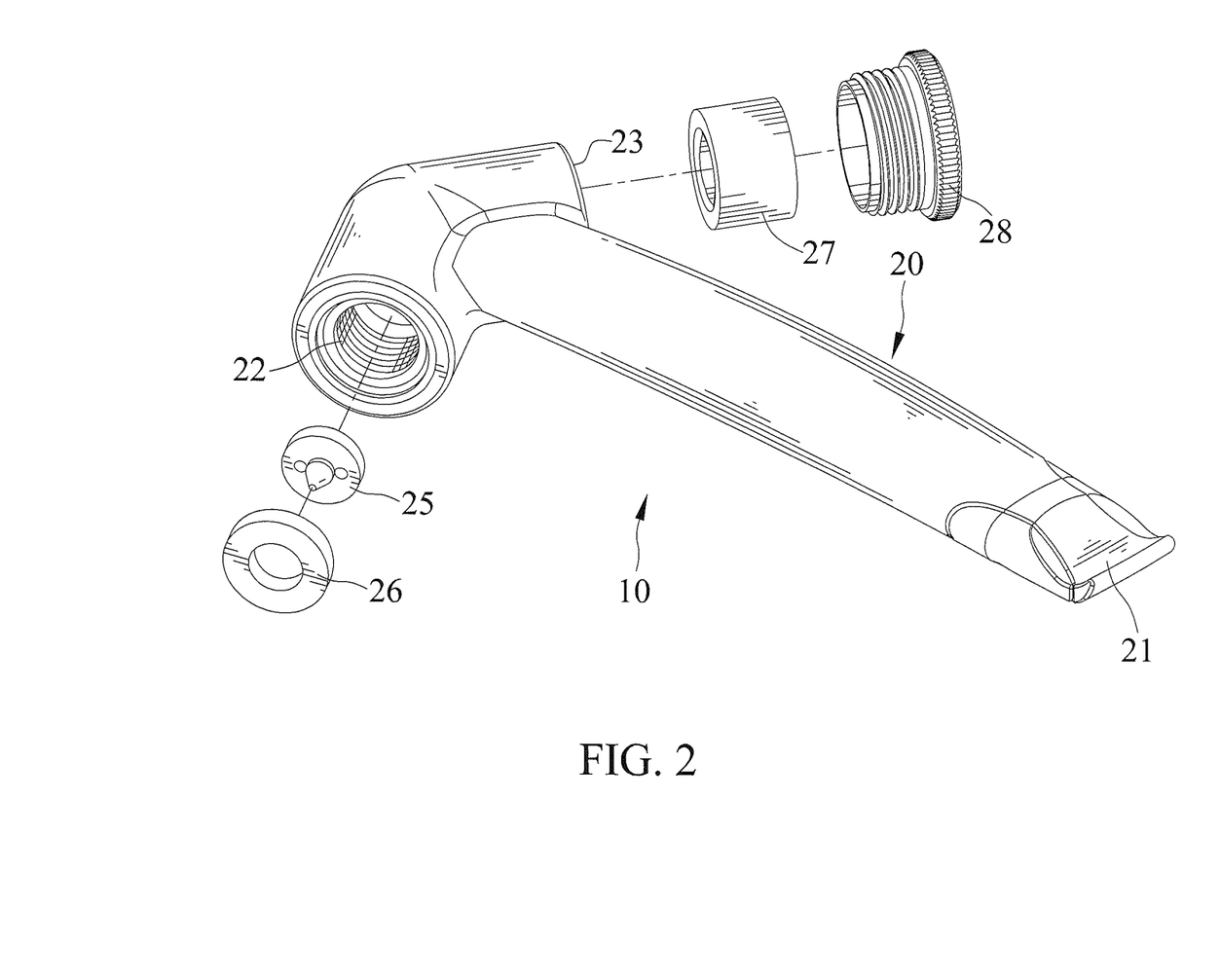
FIG. 2 is an exploded perspective view of the tire tool of FIG. 1.
Figure 3:
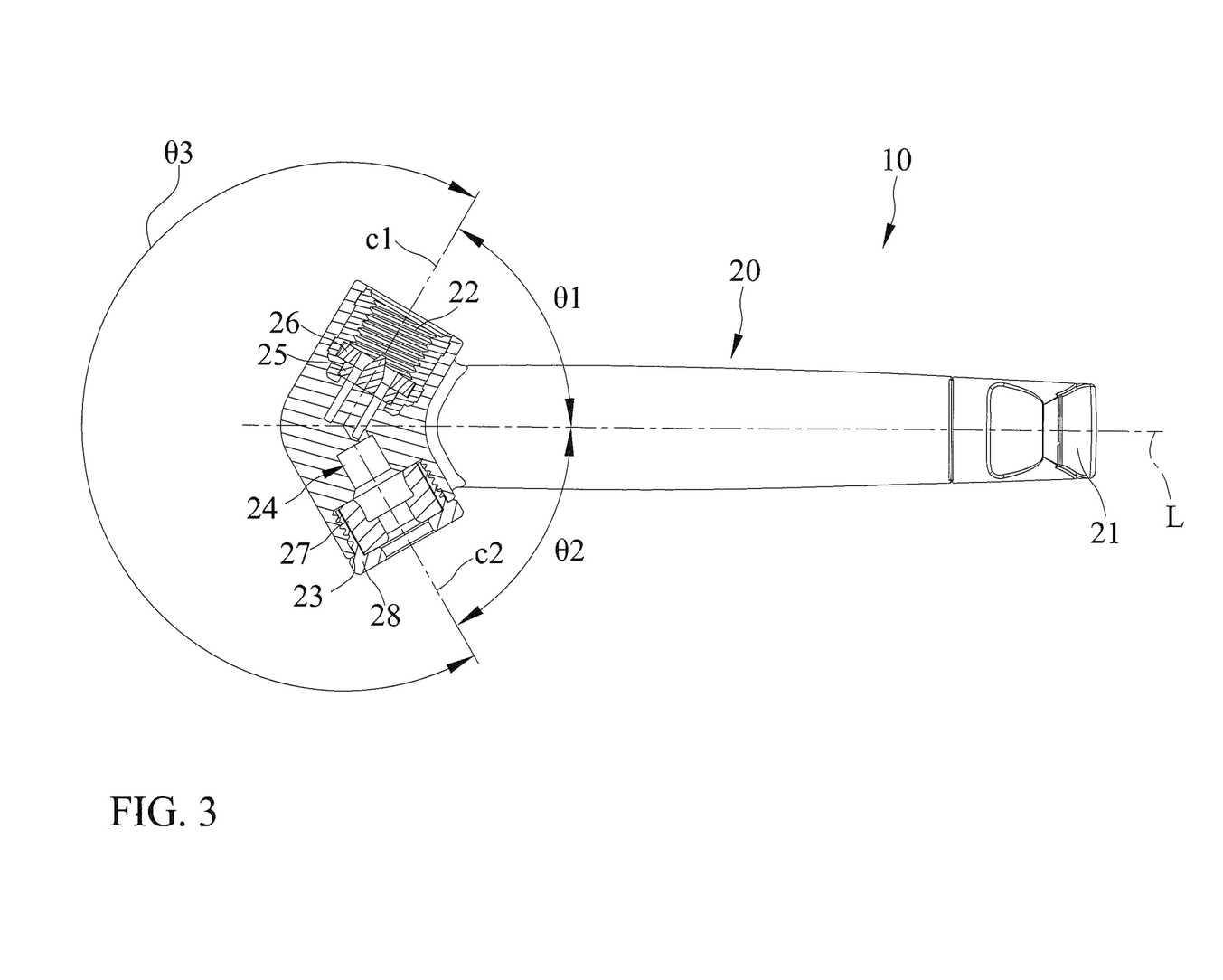
FIG. 3 is a cross-sectional view taken along line 3-3 of FIG. 1.

The first and second connecting ends 22 and 23 extend longitudinally in different directions with respect to the phantom axis L. The first connecting end 22 extends longitudinally along a first axis C1. The second connecting end 23 extends longitudinally along a second axis C2. The first axis C1 and the phantom axis L have a first included angle θ1 facing toward the tire levering end 21. The second axis and the phantom axis L have a second included angle θ2 facing toward the tire levering end 21. The first and second axes C1 and C2 have a third included angle θ3 facing away the tire levering end 21. The first included angle θ1 is between 30 and 180 degrees. The second included angle θ2 is between 20 and 180 degrees. The third included angle θ3 is not less than 10 degrees. In this embodiment, each of the first and second included angle θ1 and θ2 is an acute angle. The first included angle θ1 is 60 degrees. The second included angle θ2 is 60 degrees.

Figure 4:
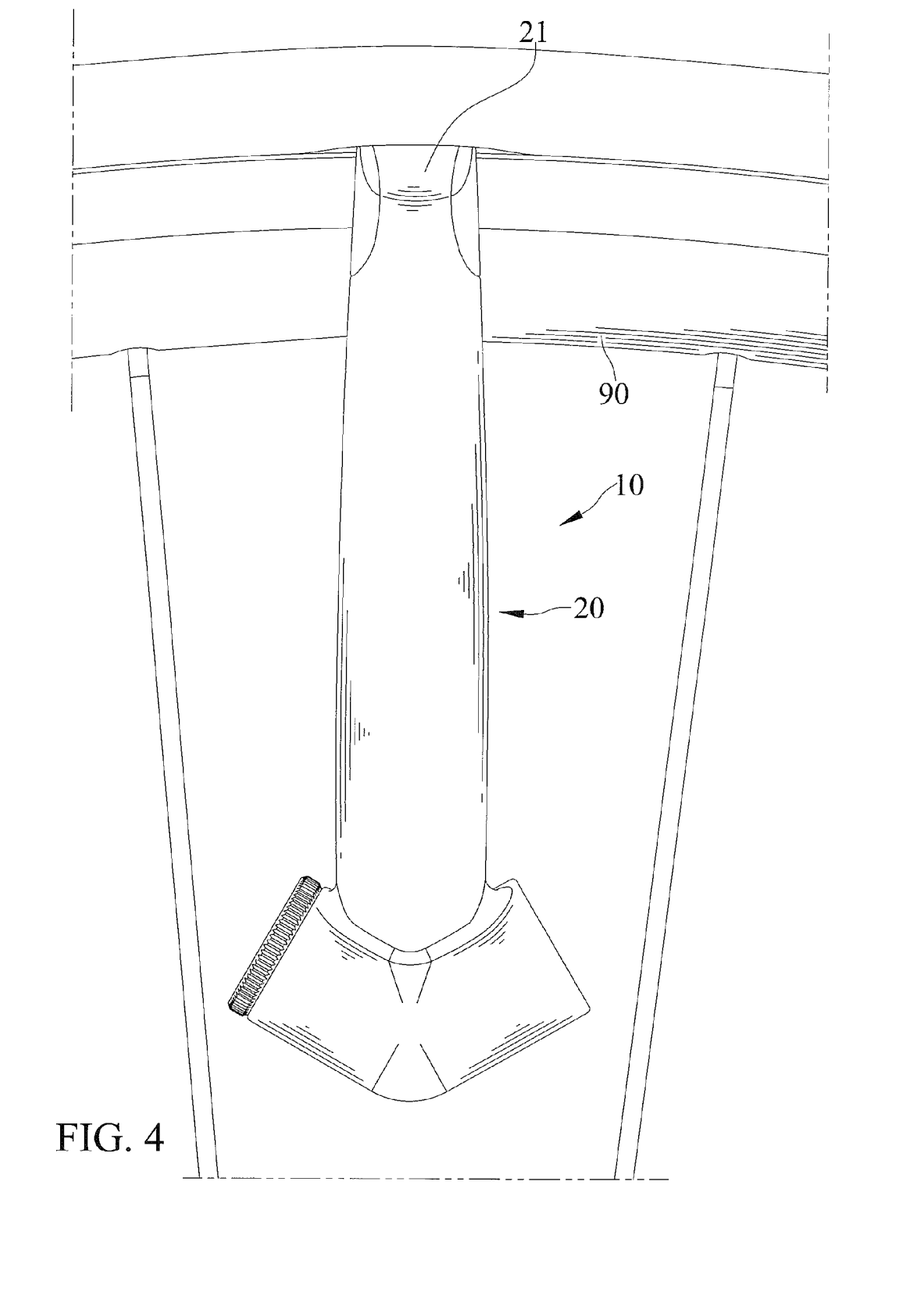
FIG. 4 is a side view showing the tire tool of FIG. 1 in use to pry a tire out of a rim.

In use of the tire tool 10 to pry a tire out of a rim sidewall of a wheel 90, the tire levering end 21 of the tire tool 10 is placed under a tire bead of the tire and above the rim sidewall of the wheel 90. Therefore, tire tool 10 can use the rim sidewall as a fulcrum to pry the tire up and over the rim sidewall.

Figure 5:
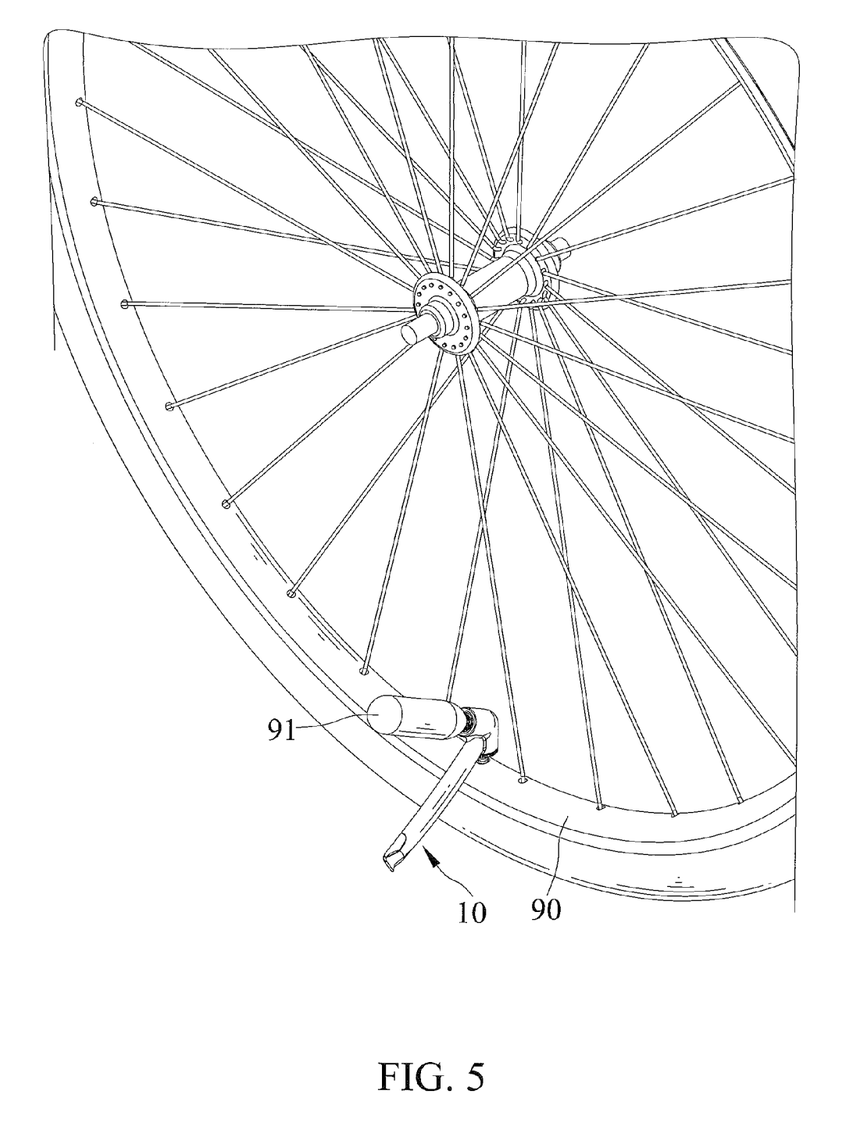
FIG. 5 is a perspective view showing the tire tool of FIG. 1 in use to inflate a tire, with the tire tool cooperating with and fluidly connecting to a cylinder having high pressure air.
Figure 6:
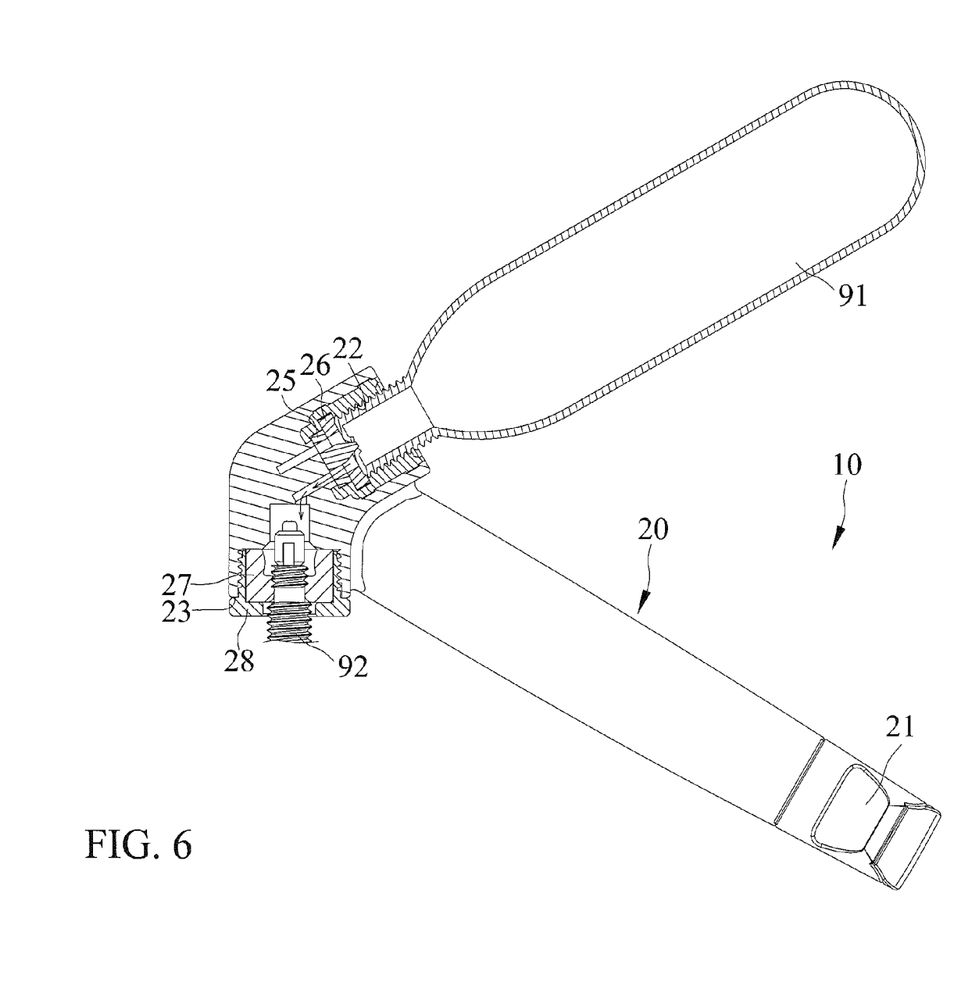
FIG. 6 is a partial, cross-sectional view of FIG. 5, showing the cylinder fluidly and valve of the tire fluidly connecting to the tire tool.

In use of the tire tool 10 to inflate a tire, a cylinder 91 having high pressure air sends air cooperates with the tire tool 10. In this embodiment, the cylinder 91 is connected to the first connecting end 22. The cylinder 91 is in thread engagement with the first connecting end 22, with outer threads of the cylinder 91 engaging with inner threads in the first fluid channel. When the cylinder 91 sends air to the first fluid channel, the valve core of the valve of the cylinder 91 abuts and is opened by the protruded end of the insert 25. Furthermore, the tire receives air from the cylinder 91 and a valve 92 of the tire fluidly connects to the second connecting end 23 and engages in the second fluid channel. In addition, the valve 92 extends through the seal 27 and the cap 28, and the seal 27 has an inner periphery abutting an outer periphery of the valve 92.

Figure 7:
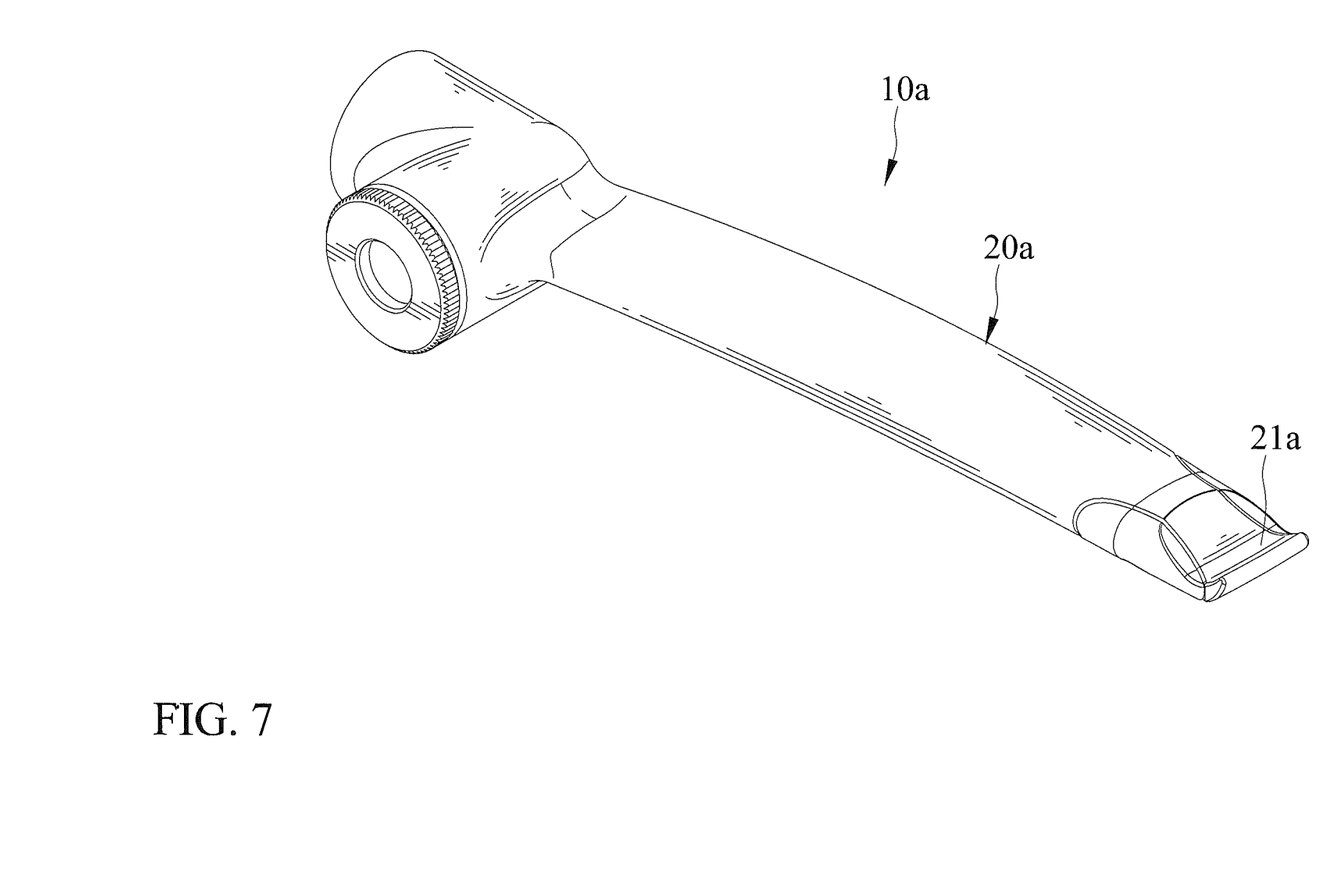
FIG. 7 is a perspective view of a tire tool in accordance with a second embodiment of the present invention.
Figure 8:
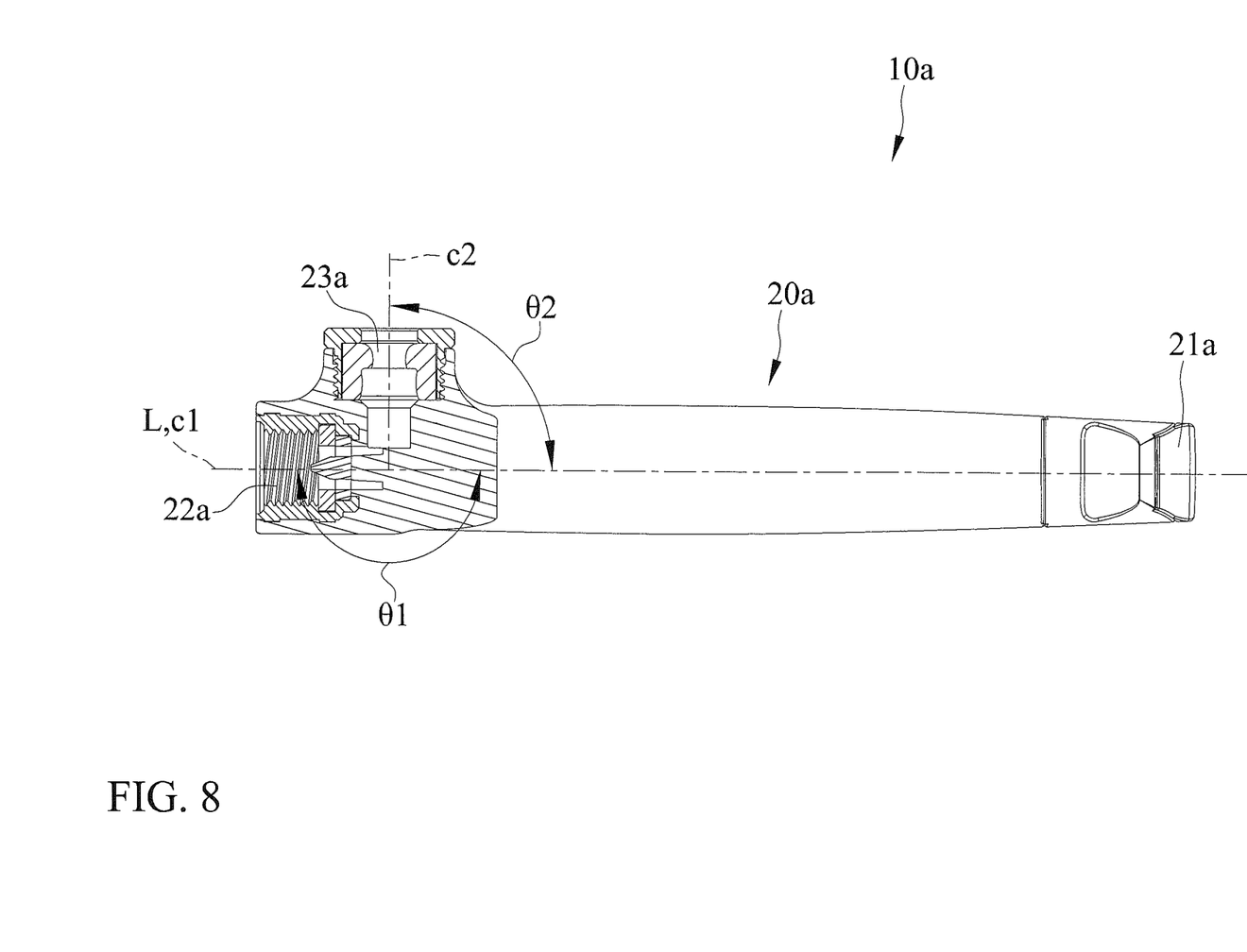
FIG. 8 is a partial, cross-sectional view of the tire tool of FIG. 7.
Figure 9:
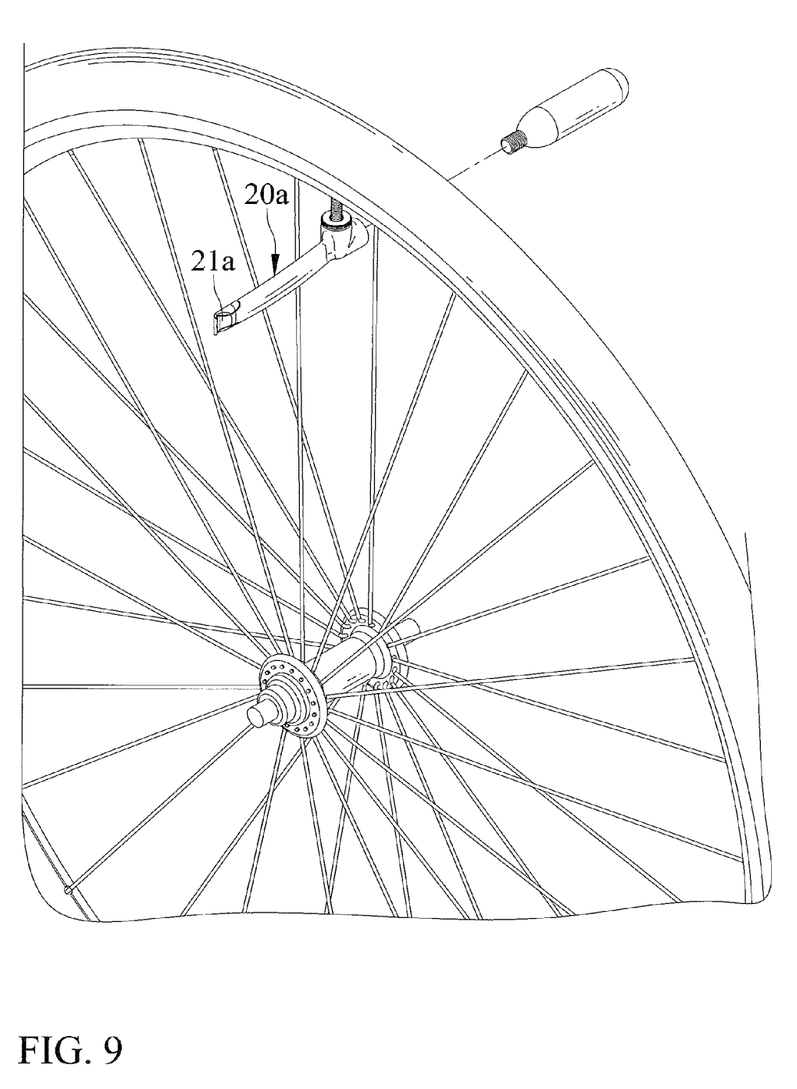
FIG. 9 is a perspective view showing the tire tool of FIG. 7 in operation to fluidly connect a cylinder having high pressure air and a valve of a tire.

FIGS. 7 through 9 show a tire tool 10a in accordance with a second embodiment of the present invention. The tire tool 10a is the same as the tire tool 10 except that a body 20a of the tire tool 10a including a tire levering end 21a extending along a longitudinal direction of the body 20a, which extends longitudinally along a phantom axis L, and an inflating end including a first connecting end 22a which extends longitudinally along the first axis C1 which cooperates with the phantom axis L and has a first included angle θ1 facing toward the tire levering end 21a, and a second connecting end 23a which extends longitudinally along the second axis C2 which cooperates with the phantom axis L and has have a second included angle θ2 facing toward the tire levering end 21a. The first included angle θ1 is 0 degree. The second included angle θ2 is 90 degrees.

In use of the tire tool 10a to inflate a tire, a cylinder having high pressure air sends air cooperates with the tire tool 10a. In this embodiment, the cylinder 91 is connected to the first connecting end 22a. Furthermore, the tire receives air from the cylinder and a valve of the tire fluidly connects to the second connecting end 23a and engages in the second fluid channel.

In view of the foregoing, a user can use the tire tools 10 and 10a to pry a tire and to cooperate with the cylinder 91 having high pressure air to inflate the tire. A user can pry the tire from the wheel 90 with the tire levering end 21 of the tire tool 10 or the tire levering end 21a of the tool 10a without suffering structural interference from the inflating ends of the tire tools 10 and 10a. In addition, the user can inflate the tire without suffering structural interference from the wheel 90 because the cylinder 91 is connected to the first connecting ends 22 and 22a of the tire tools 10 and 10a and the valve 92 is connected to the second connecting end 23 and 23a of the tire tools 10 and 10a. The first included angle θ1 facing toward the tire levering ends 21 or 21a and defined between the first connecting end 22 or 22a and the phantom axis L is in a predetermined range as set forth, as well as the second included angle θ2 facing toward the tire levering ends 21 or 21a and defined between the second connecting end 23 or 23a and the phantom axis L is in a predetermined range as set forth.

The foregoing is merely illustrative of the principles of this invention and various modifications can be made by those skilled in the art without departing from the scope and spirit of the invention.

What is claimed is:

1. A tire tool, comprising:
   a body including a tire levering end and an inflating end including a first connecting end delimiting a first fluid channel and a second connecting end delimiting a second fluid channel, with the first and second channels fluidly connecting to one another.

2. The tire tool as claimed in claim 1, wherein the tire levering end has a distal end coincident with a distal end of the body, wherein the tire levering end has a reduced thickness as it extends along a longitudinal direction of the body toward the distal end thereof, and wherein the body extends longitudinally along a phantom axis.

3. The tire tool as claimed in claim 2, wherein the first and second connecting ends extend longitudinally in different directions with respect to the phantom axis, wherein the first connecting end extends longitudinally along a first axis, wherein the second connecting end extends longitudinally along a second axis, wherein the first axis and the phantom axis have a first included angle facing toward the tire levering end, wherein the second axis and the phantom axis have a second included angle facing toward the tire levering end, and wherein the first and second axes have a third included angle facing away the tire levering end.

4. The tire tool as claimed in claim 3, wherein the first included angle is between 30 and 180 degrees, wherein the second included angle is between 20 and 180 degrees, and wherein the third included angle is not less than 10 degrees.

5. The tire tool as claimed in claim 1, wherein the first connecting end includes an insert and a gasket disposed within the first fluid channel, wherein the insert has a protruded end adapted to abut a valve core of a valve, thereby opening the valve core of the valve, and wherein the gasket has an annular shape and includes a hole extending therethrough.

6. The tire tool as claimed in claim 5, wherein the first fluid channel in the first connecting end has a periphery thereof forming inner threads.

7. The tire tool as claimed in claim 5, wherein the second connecting end includes a seal disposed within the second fluid channel and a cap connected thereto, wherein the seal has a hole extending therethrough, and wherein the cap restrains the seal and includes a hole extending therethrough, which has a diameter smaller than a diameter of the hole extending through the seal.

8. The tire tool as claimed in claim 1, wherein the first fluid channel in the first connecting end has a periphery thereof forming inner threads.

9. The tire tool as claimed in claim 1, wherein the second connecting end includes a seal disposed within the second fluid channel and a cap connected thereto, wherein the seal has a hole extending therethrough, and wherein the cap restrains the seal and includes a hole extending therethrough, which has a diameter smaller than a diameter of the hole extending through the seal.

10. The tire tool as claimed in claim 9, wherein the second fluid channel in the second connecting end has a periphery thereof forming inner threads, and wherein the cap has an outer threads engaging with the inner threads.

11. The tire tool as claimed in claim 1, where the first fluid channel delimits a first opening at a distal end of the first connecting end, and wherein the second fluid channel delimits a second opening at a distal end of the second connecting end.

12. The tire tool as claimed in claim 1, where the tire levering end and the inflating end are disposed opposite to one another axially.

* * * * *